United States Patent [19]

Boardman

[11] Patent Number: 5,511,844
[45] Date of Patent: Apr. 30, 1996

[54] CONVERTIBLE TOP HAVING SLIDABLY REPLACEABLE BOW

[75] Inventor: Robert A. Boardman, Pittsford, Mich.

[73] Assignee: Dura Convertible Systems, Inc., Adrian, Mich.

[21] Appl. No.: 139,843

[22] Filed: Oct. 22, 1993

[51] Int. Cl.[6] .................................................. B60J 7/12
[52] U.S. Cl. .......................... 296/107; 296/118; 296/214; 114/361; 160/395
[58] Field of Search ..................... 296/107, 118, 296/119, 146.14, 147, 214; 160/386, 391, 392, 395; 114/361; 135/88.01, 119

[56] References Cited

U.S. PATENT DOCUMENTS

| | | | |
|---|---|---|---|
| 1,828,355 | 10/1931 | Bulkeley | 296/107 |
| 2,036,390 | 4/1936 | Bowers | 296/214 |
| 2,213,912 | 9/1940 | Hooper | 160/395 |
| 2,556,565 | 6/1951 | Votypka | 296/118 |
| 2,580,337 | 12/1951 | Votypka | 296/107 |
| 2,708,137 | 5/1955 | Poelman | 296/107 |
| 2,765,192 | 10/1956 | Blake | 296/107 |
| 3,090,646 | 5/1963 | Johnson | 296/107 |
| 3,237,983 | 3/1966 | Hollar, Jr. | 296/107 |
| 3,953,067 | 4/1976 | Isola | 296/214 |
| 4,626,021 | 12/1986 | Muscat | 296/107 |
| 4,998,766 | 3/1991 | Biermacher et al. | 296/136 |
| 5,154,479 | 10/1992 | Sautter, Jr. | 296/121 |

FOREIGN PATENT DOCUMENTS

| | | | |
|---|---|---|---|
| 248240 | 12/1987 | European Pat. Off. | 296/214 |
| 3606165 | 8/1987 | Germany | 296/118 |
| 1057247 | 2/1967 | United Kingdom | 135/119 |

Primary Examiner—Andrew C. Pike
Attorney, Agent, or Firm—David A. Greenlee

[57] ABSTRACT

A convertible top comprises a frame having a header and three transverse bows, a fabric cover for the frame, side stay pads, a panel containing a backlite, and an interior headliner. The bows and header are interconnected by articulated side linkages. The header and the #2, #3 and #4 bows have elongated open ended extrusions with transverse channels extending along their surfaces. The #4 bow includes an extra transverse channel. The fabric cover is initially attached to the header. The fabric cover, the headliner, and the stay pads all have transverse resilient attachment strips adjacent the header and/or each bow which are inserted into the bow channels to mount them on the top frame. The upper edge of the backlite also has a mounting strip received in the extra channel of the #4 bow. The attachment strips each has an arrow-shaped cross section including a wide arrowhead that is compressible for insertion through a narrow entry slot into a channel. Removable locating stops are provided in each channel to positively locate the attachment strips on the bows. A damaged bow is replaced by disengaging the bow from the side linkages, removing the locating stops, and sliding the bow endwise off the attachment strips.

8 Claims, 6 Drawing Sheets

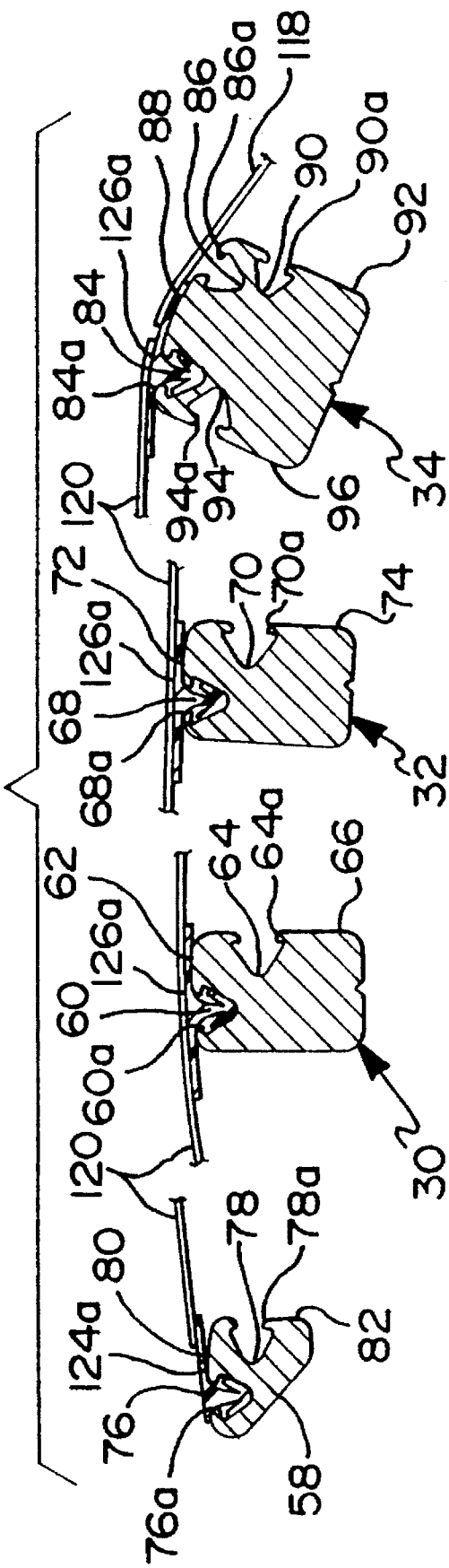

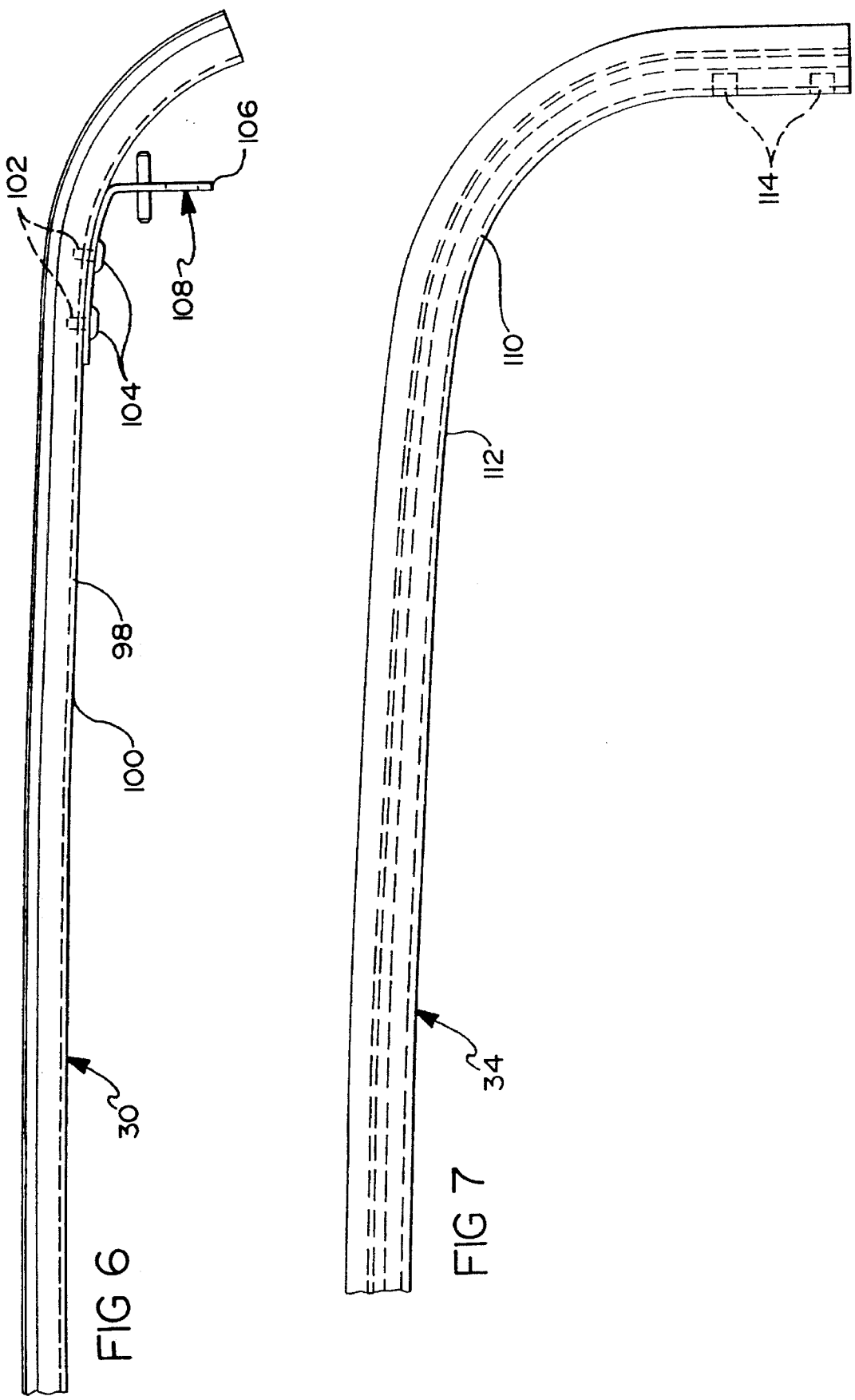

CONVERTIBLE TOP HAVING SLIDABLY REPLACEABLE BOW

BACKGROUND OF THE INVENTION

This invention relates generally to vehicle convertible tops and, more particularly, to top frame bow construction and the attachment of the top cover to the top frame bows.

Convertible vehicles incorporate a collapsible top structure which comprises a frame including spaced articulated side linkages and a fabric cover. The top is lowered by articulating the linkages which collapses the frame and folds the cover for storage in a storage well behind the vehicle passenger compartment. Top movement may be by manual or power operation.

The top frame generally has spaced side linkages, each of which comprise front, center, and rear side rails and control links pivoted to the vehicle body. The top frame also includes four or five transverse cross bows, termed the header, or #1 bow, and the #2, #3, #4, and #5 bows which interconnect the articulated side linkages. A fabric top cover is supported by and is secured to the header and the transverse bows to assure movement with, and folding by, the frame as it collapses upon top lowering and unfolds upon top raising. In a four bow top, the rear edge of the top cover is attached to the vehicle body. In a five bow top, the rear edge of the top cover is attached to the #5 bow, which is movable relative to the vehicle body.

A backlite is conventionally sewn into a panel located in the top cover between the #4 bow and either the body or the #5 bow. The #2, #3, and #4 bows are bent near their ends to give curvature to the sides of the raised top. Longitudinally-extending side and rear stay pads are located atop the bow bends beneath the top cover to prevent sagging of the fabric at the cover side curvature.

Conventionally, the bows are made of rolled steel channels which contain wood or plastic tacking strips. Spaced transverse fabric flaps are sewn to the fabric cover. The top is assembled front to back. The front of the cover and the front of the stay pads are stapled, or "tacked", to the header tacking strip. The flaps and the side stay pads are then stapled to the tacking strips of the #2 and #3 bows. The rear ends of the side stay pads, the top ends of the rear stay pads, a flap, and the top of the backlite panel are stapled to the #4 bow tacking strip. The cover rear edge and the bottom ends of the rear stay pads are stapled to the #5 bow tacking strip or to the vehicle body around the top of the storage well.

With so many staples, it is not uncommon for staples to engage other staples and break, leaving upstanding sharp points. If these broken staples are not noticed immediately and removed, they will pierce the cover fabric when it is fully installed and render the top defective. This requires replacement of the fabric cover, which is an expensive and time-consuming process.

This conventional installation, or "trimming" of the fabric cover on a convertible top frame, using the above described techniques, is a tedious, time consuming and expensive procedure. Convertible top fabric covers are, by their nature, less durable than the vehicle itself. It is common to replace the fabric cover several times during the life of the vehicle. Replacement of the fabric cover requires removing the staples and tacks and detaching the other connections between the cover and bows to remove the fabric cover. The trimming process must then be repeated to mount the new cover.

It would be desirable to provide a convertible top which enables a simpler, quicker, and cheaper means of trimming the top.

It would also be desirable to provide a top structure which incorporates cover attachments to the bows that facilitate top cover installation and replacement.

An additional problem produced by the trimming of a convertible top with conventional bows is the incidence of bow "read through". This phenomenon is the visible outline of the bows which projects or "reads" through the tautened fabric cover when the top is raised and latched. This detracts from the aesthetic appearance of the top.

Thus, it would be desirable to provide a convertible top having bows that reduce or eliminate the phenomenon of bow "read through" when the top is raised and latched.

An increasingly important consideration in passenger vehicle design and manufacture is total vehicle weight. It is desirable to reduce the weight of all vehicle components including the convertible top mechanism.

SUMMARY OF THE INVENTION

It is therefore an object of this invention to provide a convertible top which enables a simpler, quicker, and cheaper means of trimming the top.

It is another object of this invention to provide a top structure which incorporates cover attachments to the bows that facilitate top cover installation and replacement.

It is a further object of this invention to provide a convertible top having bows that reduce or eliminate the phenomenon of bow "read through" when the top is raised and latched.

It is a yet further object of this invention to provide a convertible top mechanism having reduced weight.

Accordingly, this invention features a convertible top which comprises a frame having a header and three transverse bows, a fabric cover for the frame, side stay pads, a panel containing a backlite, and an interior headliner. The header and the #2 and #3 bows comprise elongated aluminum or plastic extrusions with two channels extending along their surfaces. The #4 bow is an elongated extrusion having four channels. The fabric cover is initially attached to the header. The fabric cover, the headliner, and the stay pads all have transverse resilient attachment strips adjacent the header and/or each bow which are inserted into the bow channels to mount them on the top frame. The upper edge of the backlite also has an attachment strip received in the third channel of the #4 bow. The attachment strips all have an arrow shape which include wide arrow head retention portions that are compressible for insertion through a narrow entry slot into the channels.

In one aspect, this invention comprises a transverse bow for a convertible top frame which supports a top cover, a backlite, and a headliner. The bow comprises an elongated support member having upper, lower, and side surfaces, a first channel formed in the upper surface for receiving a top cover-mounted attachment strip, a second channel formed in another surface for receiving a headliner-mounted attachment strip, and a mounting bracket mounted on each end of the support member.

In another aspect, this invention comprises a convertible top including a frame having a header and a plurality of transverse bows and a fabric cover for the frame. Each bow comprises an elongated transverse support member having a channel with an entry slot. A transverse attachment strip is secured on the underside of the fabric cover adjacent each support member and has a depending elongated retention portion that is pressed through the entry slot into a channel to mount the fabric cover on the bows.

Preferably, each bow comprises an aluminum extrusion that has a circular outer surface and attachment strip locating stops located in the channels.

In yet another aspect, this invention comprises a convertible top including a frame having a header and a plurality of transverse bows, a fabric cover for the frame, side stay pads, a panel containing a backlite, and an interior headliner. All of the bows comprise an elongated extruded support member having upper, lower, and side surfaces, a transverse extending along the upper surface, and a channel extending along one of the side surfaces. A transverse cover attachment strip is secured to the underside of the fabric cover adjacent each bow and has a depending retention portion which is inserted into the upper channel to mount the fabric cover on the bow. A transverse headliner attachment strip has a retention portion adjacent each bow which is inserted into the side channel to secure the headliner to the bow.

Preferably, a transverse cover mounting strip is secured to the underside of each stay pad adjacent each bow and has a depending retention portion inserted into each bow upper channel to secure the stay pads to the bows. Also, preferably, the #1 bow has a channel extending along its upper surface to receive a fourth headliner attachment strip. Further, preferably, a transverse attachment strip secured to the backlite is inserted into another channel in the upper surface of the #4 bow to secure the backlite to the bow.

Other objects and features will become more readily apparent upon reference to the following detailed description of a preferred embodiment, as illustrated in the accompanying drawings, in which:

BRIEF DESCRIPTION OF THE DRAWINGS

FIG. 5 is a discontinuous sectional view of the top, taken along the line 5—5 of FIG. 1;

FIG. 6 is a partial front elevation of a #2 or #3 bow, according to this invention;

FIG. 7 is a partial front elevation of a #4 bow, according to this invention;

DETAILED DESCRIPTION OF A PREFERRED EMBODIMENT

Figure 1:
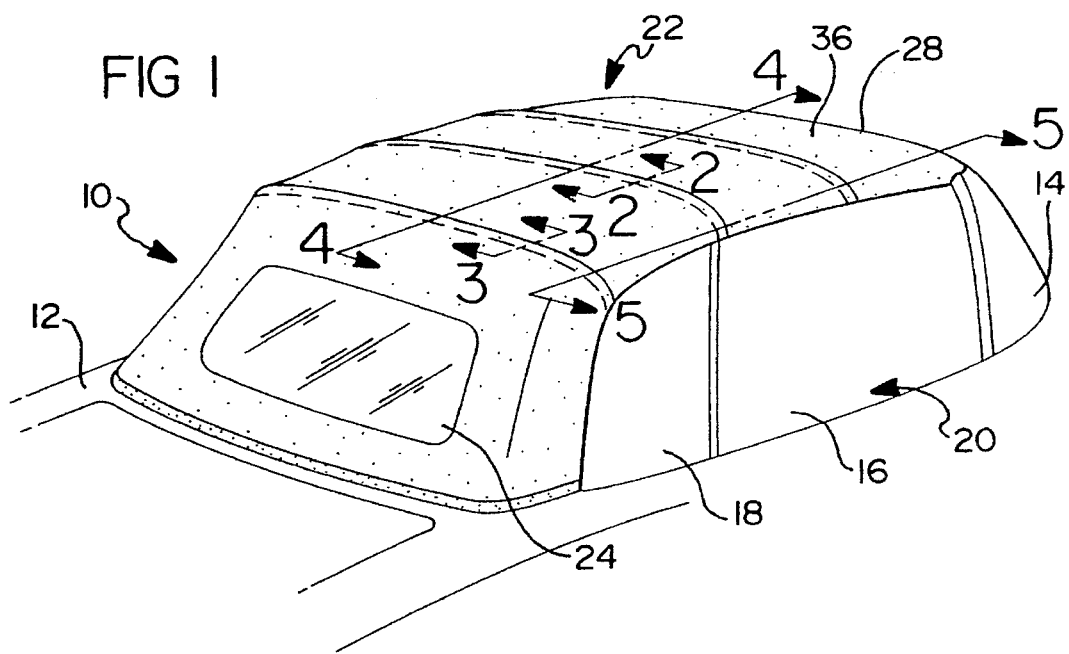
FIG. 1 is a partial perspective view of a vehicle having a convertible top according to this invention.

Referring now to FIG. 1 of the drawings, an automotive vehicle 10 has a body 12 which includes a windshield 14 and side door windows 16 and rear quarter windows 18 (only one of each shown) flanking a passenger compartment 20. A convertible top 22 closes passenger compartment 20 and includes a backlite 24.

As shown in FIGS. 2–5, top 22 has a mechanical structure comprising conventional articulated side linkages (not shown), such as illustrated in U.S. Pat. No. 3,608,956—Adamski, which interconnect the sides of a header 28, or #1 bow, and spaced transverse #2, #3, and #4 bows, numbered 30, 32, and 34, respectively. Header 28 and bows 30, 32, and 34 comprise transverse supports for a fabric cover 36 above and a headliner 38 below. Headliner 38 is provided to mask the top structure from view by the vehicle passengers and includes a front panel 40 which is attached to a header flange 42 by the capture of front panel mounting plugs 44 in flange apertures 46.

Header 28 includes an upper support 48 which mounts flange 42 and a lower support 50 which mounts a pilot pin 52. Header 28 is secured to the usual windshield header (not shown) by engagement of a J-hook 54 with a pin 56 mounted on the windshield header. This arrangement may be operated by the conventional manual mechanism, or preferably is operated by the power mechanism as shown in U.S. Pat. No. 5,154,479—Sautter, Jr.

Bows 30, 32, and 34 are preferably aluminum extrusions, but could also be plastic. Header upper support 48 mounts a further transverse elongated aluminum extrusion 58. Each of these extrusions includes elongated channels for mounting the fabric cover 36, headliner 38, and stay pads 118 and 120, as will now be described.

Figure 2:
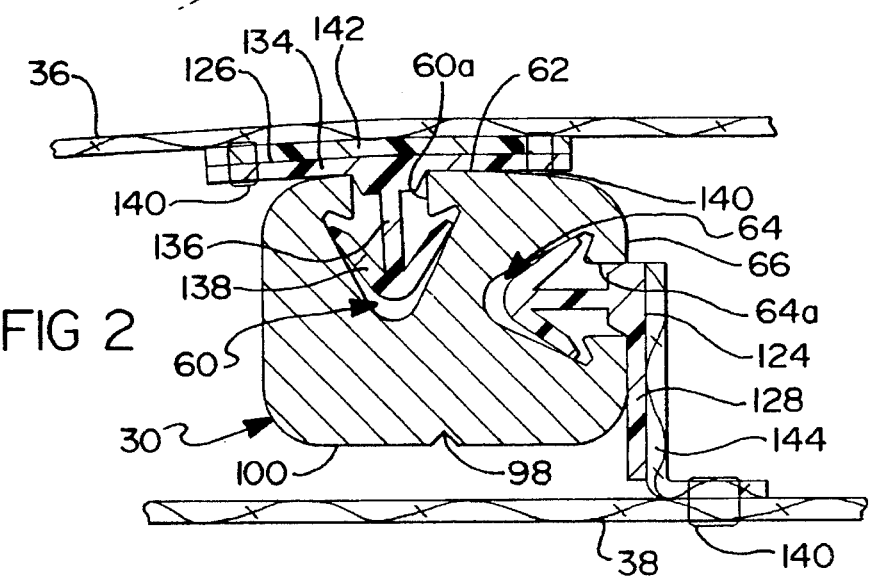
FIG. 2 is an enlarged sectional view taken along line 2—2 of FIG. 1.

The #2 bow 30 is shown in greater detail in FIGS. 2 and 6. It includes a transverse arrow-shaped channel 60 having an entry slot 60a, which is formed in its upper surface 62, which is rounded, preferably arcuate. A similar transverse arrow-shaped channel 64, having an entry slot 64a, is formed in the bow side surface 66.

Figure 4:
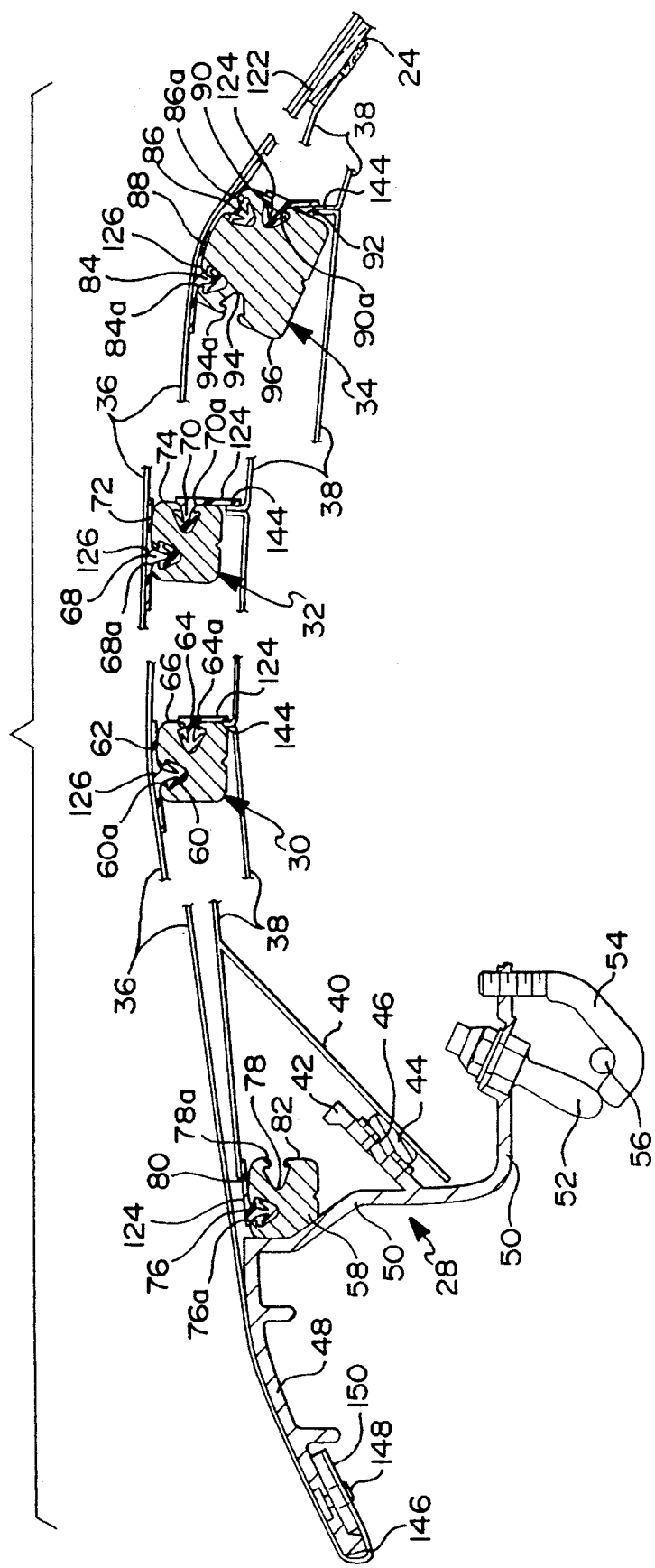
FIG. 4 is a discontinuous sectional view of the top, taken along the line 4—4 of FIG. 1.

As shown in FIGS. 4 and 5, #3 bow 32 is similarly configured, including transverse arrow-shaped upper and side channels 68 and 70, with respective entry slots 68a and 70a, in its arcuate upper surface 72 and in its side surface 74. Header (#1 bow) extrusion 58 also includes similar upper and side channels 76 and 78, with respective entry slots 76a and 78a, in its arcuate upper surface 80 and in its side surface 82.

Figure 3:
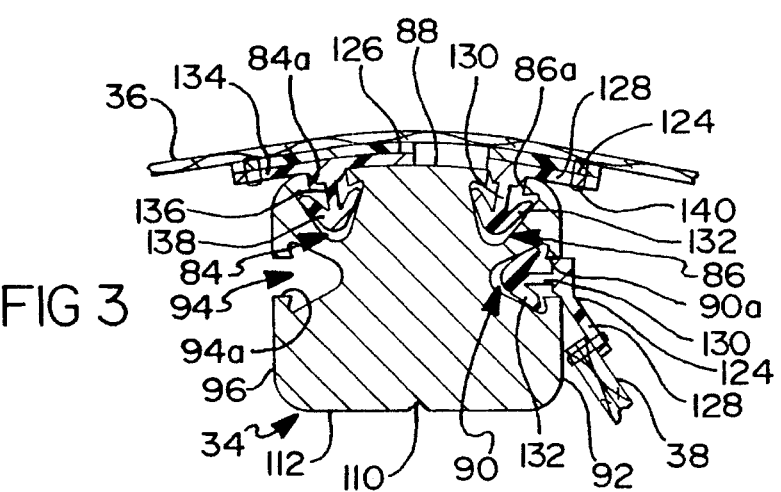
FIG. 3 is an enlarged sectional view taken along line 3—3 of FIG. 1.

The extrusion of #4 bow 34 is somewhat larger than the other bows 30 and 32, and is best seen in FIGS. 3, 4, and 7. It includes front and rear arrow-shaped channels 84 and 86, having entry slots 84a and 86a, in its arcuate upper surface 88. An arrow-shaped channel 90, having an entry slot 90a, is formed in the rear side surface 92, while channel 94, having entry slot 94a, is formed in front side surface 96. This makes bow 34 symmetrical about a vertical plane, which facilitates top construction, by eliminating the possibility that the rear bow can be installed backward.

Bow 30 is conventionally curved at its ends, as illustrated in FIG. 6, which shows only one end of the bow. FIGS. 2 and 6 show a center groove 98 formed in the lower surface 100 of bow 30. Groove 98 is a 120° V-notch which allows self-centering of the drill bit used to drill mounting holes 102 during fabrication of the bow. Holes 102 receive screws 104 which mount a bracket 106 having a an aperture 108 for receiving a pivot pin on a side rail (not shown) to conventionally attach bow 30 to the articulated side linkages of the top mechanism, not shown. Bow 32 is identical in construction. FIGS. 3 and 7 illustrate that rear bow 34 is more severely curved at its ends and similarly includes a center groove 110 in bottom surface 112 to aid in the drilling of mounting holes 114 for a mounting bracket (not shown).

Figure 10:
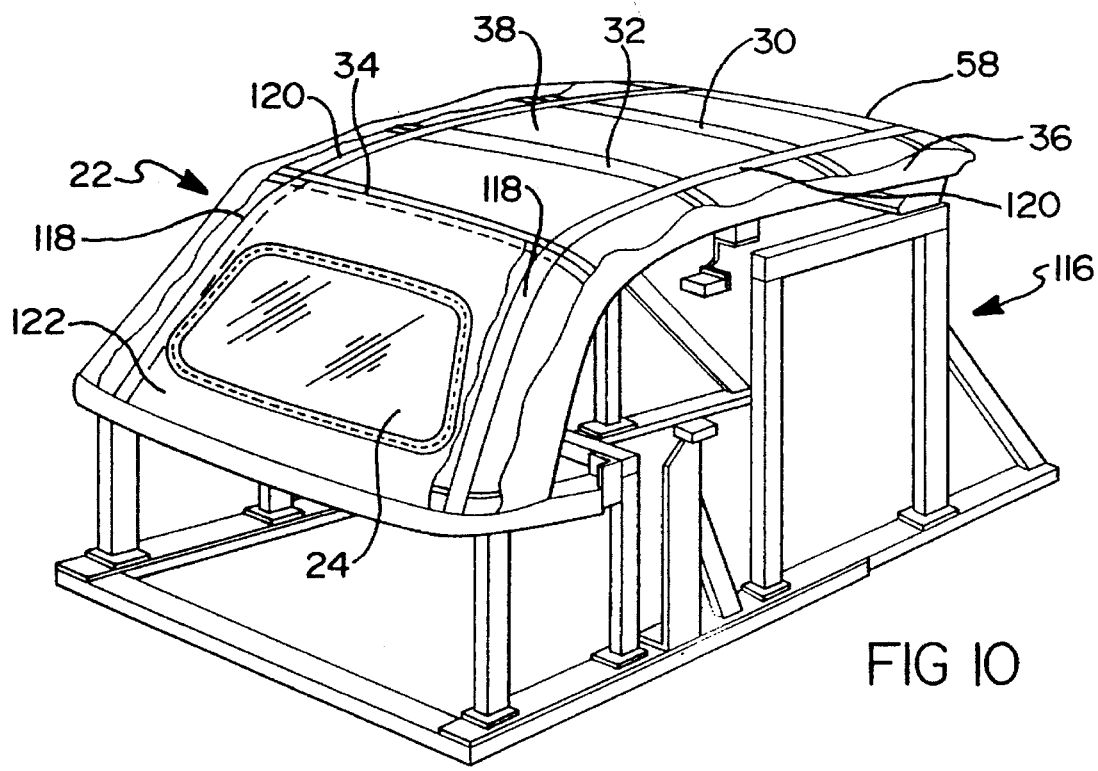
FIG. 10 is a perspective view of a convertible top according to this invention, shown on an assembly buck and partially broken away to illustrate details of construction.

FIG. 10 illustrates trimming of top 22 by assembling fabric cover 36 and headliner 38 to the top structure, which is mounted on an assembly buck 116, that is configured to assure that the resulting trimmed top will fit vehicle 10. Rear and front side stay pads 118, 120, typically made of woven fabric webbing, are interposed between fabric cover 36 and extrusion 58 and bows 30, 32 and 34 near both ends. The stay pads prevent sagging of the fabric cover between bows and, with the rounded outer bow surfaces, reduces bow "read through" when the top is raised. A rear fabric panel 122, which mounts backlite 24, completes the top cover.

Figure 8:
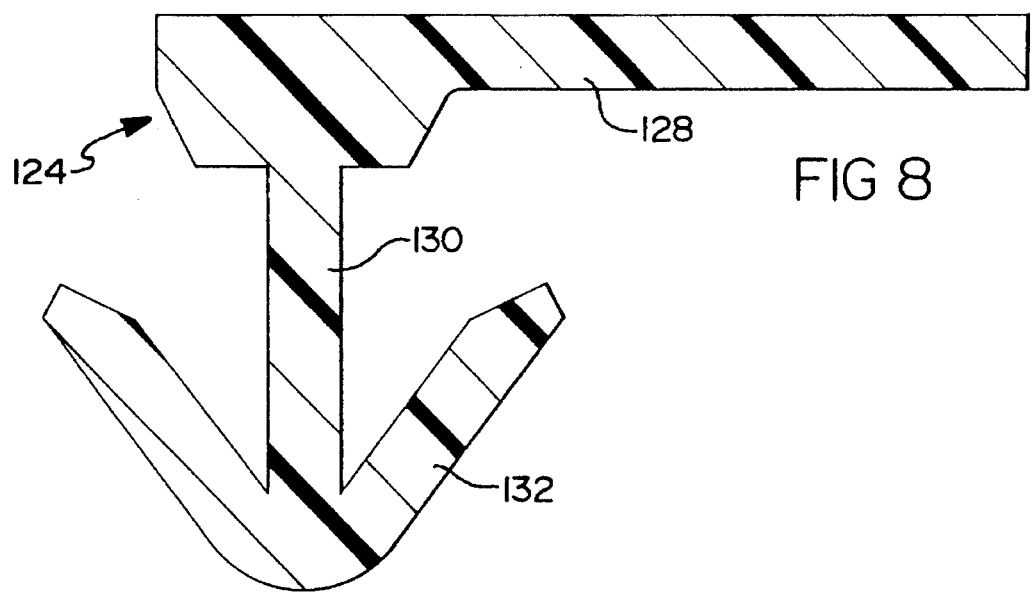
FIG. 8 is an enlarged sectional view of a mounting strip for mounting a stay pad or headliner to a top bow.
Figure 9:
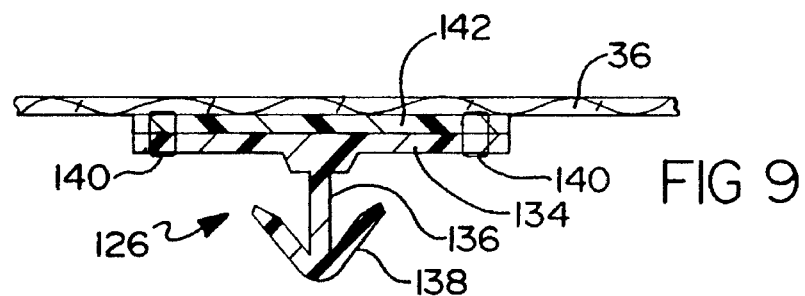
FIG. 9 is an enlarged sectional view of a mounting strip for mounting the fabric cover to a top bow.

FIGS. 8 and 9 show attachment strips 124 and 126 which are used to assemble the soft components (cover 36, headliner 38, rear panel 122, and stay pads 118, 120) to header extrusion 58 and bows 30, 32, and 34. Each attachment strip is an elongated flexible neoprene strip of constant section. Attachment strip 124 comprises a mounting base 128 from which extends a shank 130 that supports a retention portion or head 132 having an arrowhead shape. Attachment strip 126 comprises a mounting base 134, from which extends a shank 136 that supports a retention portion or head 138 having an arrowhead shape. Base 134 is sewn at 140 to a strip of heat seal tape 142.

As illustrated in FIGS. 2, 3, and 9, attachment strips 126 are attached to fabric cover 36 by heat seal tape 142 adjacent upper slots 60a and 68a of bows 30 and 32 and adjacent upper slots 84a and 86a of bow 34. As shown in FIG. 4, attachment strip 124 is attached to the rear backlite-mounting panel 122. These strips extend only along the central portion of cover 36 between stay pads 118, 120. Alternatively, the attachment strips could be attached to depending flaps which are sewn into fabric cover 36 at these locations.

Attachment strips 124 are attached to the front edge of headliner 38 and to tabs 144 at locations adjacent slots 64a and 70a of bows 30 and 32, and slots 90a of bow 34 by sewing the base 128 to the headliner cloth.

Short segments 124a and 126a of attachment strips 124 and 126 are utilized to mount stay pads 118 and 120, as shown in FIG. 5. The bases of short segments 124a are sewn to stay pads 118 and 120 adjacent header extrusion slot 76a. The bases of short segments 126a are sewn to stay pads 118 and 120 at spaced intervals adjacent bow slots 60a, 68a, and 84a.

Top 22 is trimmed as follows. As shown in FIG. 5, front stay pads 120 are attached to header extrusion 58 and to bows 30, 32, and 34 by pressing the heads of strips 124a and 126a through slots 76a, 60a, 68a, and 84a into channels 76, 60, 68, and 84. Rear stay pads 118 are attached to rear strip 126a which is received in rear bow channel 84. Next, as shown in FIG. 4, headliner 38 is attached to header extrusion 58 and to bows 30, 32, and 34 by pressing the heads of front strip 124 through slot 76a into channel 76. Next strips 124 are pressed through entry slots 64a, 70a, and 90a into channels 64, 70, and 90.

Fabric cover 36 is then secured to header 28 by folding front edge 146 around support 48 and securing it by staples 148 to a tacking strip 150. Alternatively a hook-and-loop fastener could be used. Strip heads 126 are then pressed through entry slots 60a, 68a, 84a, and 86a into channels 60, 68, 84, and 86 to secure cover 36 to bows 30, 32, and 34. When later installed in a vehicle body, the rear edge of fabric cover 36 will be conventionally secured about the periphery of the top storage well (not shown) behind the passenger compartment 20 by stapling to a tacking strip or by hook-and-loop fasteners.

Figure 11:
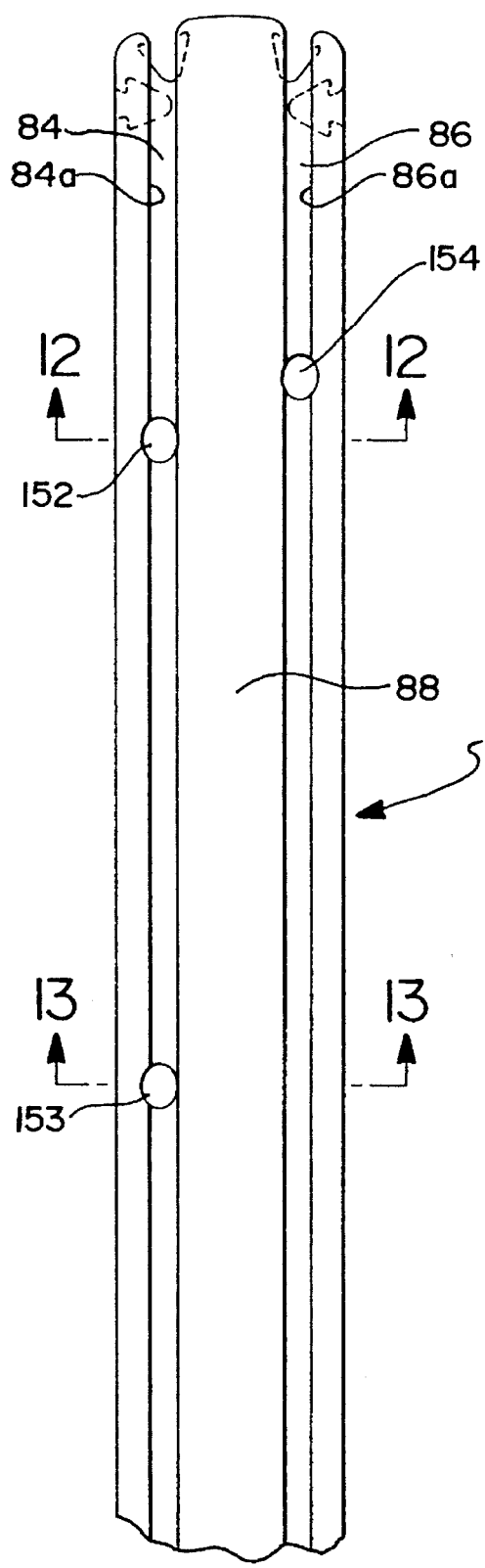
FIG. 11 is a partial plan view of the #4 bow, illustrating the locating stop mounting holes for the mounting strips.
Figure 12:
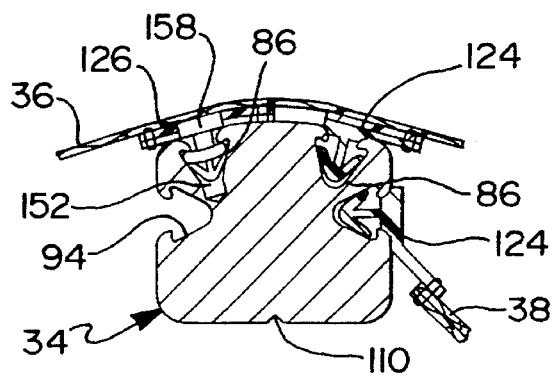
FIG. 12 is a sectional view taken along line 12—12 of FIG. 11, but with locating stops and mounting strips shown installed.
Figure 13:
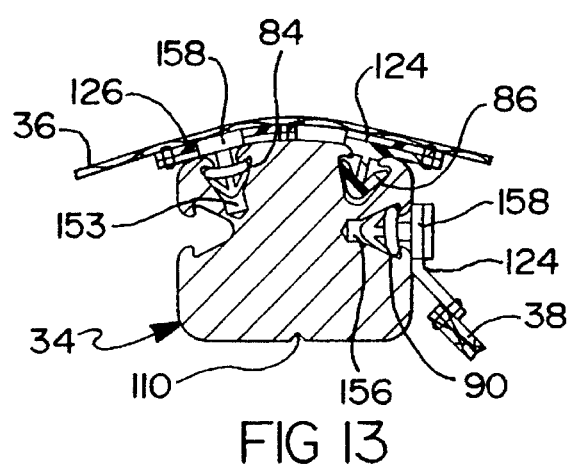
FIG. 13 is a sectional view taken along line 13—13 of FIG. 11, but with the mounting strips shown installed.

FIGS. 11–13 illustrate how the installed soft portions of the top (i.e. headliner, stay pads, and fabric cover) are maintained in proper orientation during use and operation of the top. FIG. 11 shows only one end of #4 bow 34, although the other end is identical. Spaced locating holes 152 and 153 are drilled through both ends of channel 84 and locating holes 154 and 156 are drilled through both ends of channels 86 and 90. Holes 152 and 153 at each end are spaced the width of the stay pad attachment strips 126a. Holes 153 at either end are spaced apart the width of the attachment strip 126 of top cover 36. Holes 154 at either end are spaced apart the width of attachment strip 124 of rear panel 122. Holes 156 at either end are spaced apart the width of attachment strip 124 of headliner 38.

Although not specifically illustrated, similar locating holes are provided in channels 76 and 78 of header extrusion 58, and in channels 60 and 64 of bow 30, and channels 68 and 70 of bow 32. Prior to installation of the attachment strips into the channels in the header extrusion and bows, locating stops 158, shown here as pop rivets, are installed in all locating holes in bows 30, 32, and 34 and header extrusion 58. Stops could also take the form of a slotted-head, quarter-turn plastic member.

The attachment strips are then installed between the pairs of stops. After installation of all attachment strips, these locating stops provide a positive location for the attachment strips and prevent any side shifting of the stay pads, headliner, and top cover during top operation and use.

By using the attachment strips and bows of this invention, the cover, headliner, and stay pads may be quickly and accurately attached to the header and the #2, #3 and #4 bows. This attachment is both quick and secure. The arrow-shaped heads provide a one-way connection. As the heads pass through the entry slots, they expand into the channels and cannot easily be pulled back through the entry slot. The design and material of the attaching strips are chosen to resist removal by any forces normally applied to the strips during operation of the top and of the vehicle. This assures that fabric cover 36 will remain attached to the top structure at any vehicle speed.

However, the cover may be removed by applying a sufficiently large force sequentially to each strip to deform the strip heads and enable them to be pulled back through the entry slots. This enables a worn cover to be easily removed. A new cover can then be easily installed by merely attaching the strips to the header and bows as described above.

This construction also enables a damaged bow to be readily replaced without destroying the soft portions of the top or without requiring a lengthy and costly procedure. Referring to FIGS. 4, 5, and 6, screws 104 are removed to disassemble bow 30 from the side linkages. Next, stops 158 are removed and the bow is slid endwise off the ends of the attachment strips. The new bow with stops 158 installed is assembled to brackets 106 of the side linkages by replacing screws 102. Attachment strips 124, 126 and 126a are then snapped into channels 60 and 64.

While only a preferred embodiment has been illustrated and described, obvious modifications thereof are contemplated within the scope of this invention and the following claims.

I claim:

1. A convertible top comprising a frame having a header and a plurality of transverse bows, each bow comprising an elongated extruded support member having a transverse channel with an entry slot restricting entry to the channel, a fabric cover supported by the frame, and means attaching the cover to the bows of the frame comprising a plurality of transverse cover attachment strips each of which is secured on the fabric cover adjacent one of said support members and has a depending elastomeric retention portion which compresses for passage through the entry slot into the channel of the respective support member and expands in said channel to mount the fabric cover on the frame, wherein the cover attachment strips' retention portions cooperate to secure the fabric cover against removal from the frame during normal top operation, while enabling removal of the fabric cover from the frame upon application of a sufficiently large force exerted on each attachment strip to deform its retention portion sufficiently to enable passage thereof back through the respective entry slot, and wherein each channel and its entry slot are open-ended, enabling dismounting of a selected bow from the fabric cover by endwise sliding of said selected bow relative to its respective attachment strip.

2. The convertible top of claim 1, wherein each support member has a second open-ended transverse channel with an open-ended entry slot restricting entry to said second channel, and the top includes a headliner having a transverse headliner attachment strip located adjacent each support member and has a depending elastomeric retention portion which compresses for passage into each support member second channel through its entry slot and expands in said second channel to mount the headliner to the frame.

3. The convertible top of claim 2, wherein each attachment strip retention portion has an arrowhead shape which compresses to facilitate insertion into a respective said channel through its entry slot and expands after insertion to inhibit withdrawal through the respective entry slot.

4. The convertible top of claim 3, including removable locating means inserted into each channel to laterally locate the attachment strips in their respective channels, the locating means being removable to enable dismounting of the selected bow from the fabric cover by endwise sliding of the selected bow relative to its respective attachment strips.

5. The convertible top of claim 1, wherein the top includes side stay pads each having a transverse stay pad attachment strip that is located adjacent each support member and has a depending elastomeric retention portion which compresses for passage into the channel of the respective support member through its entry slot outboard of the cover attachment strip and expands in said channel, the stay pad attachment strips cooperating to mount the stay pads to the frame.

6. The convertible top of claim 1, wherein one of the support members includes a second open-ended transverse channel with an open-ended entry slot restricting entry to the second channel, and the top includes a panel containing a backlite having a transverse backlite panel attachment strip located adjacent said one of the support members and has a depending elastomeric retention portion which compresses for passage into the second channel through its entry slot and expands in said second channel to mount the backlite panel to said one support member.

7. A convertible top comprising a frame having a header and a plurality of transverse bows, each bow comprising an elongated extruded support member having first and second transverse channels each having an entry slot restricting entry to the respective channel, a fabric cover supported by the frame, means attaching the fabric cover to the bows of the frame comprising a plurality of transverse cover attachment strips secured on the fabric cover and located adjacent each support member, each attachment strip having a depending elastomeric retention portion that has an arrowhead shape which compresses to facilitate insertion into a respective said first channel through its entry slot and expands after insertion to inhibit withdrawal and mount the fabric cover on the bows, side stay pads having a plurality of transverse stay pad attachment strips that are located adjacent each support member and have depending elastomeric retention portions that each have an arrowhead shape which compresses to facilitate insertion into a respective said first channel through its entry slot outboard of the cover attachment strip and expands after insertion to inhibit withdrawal and mount the stay pads on the bows at either end thereof, an interior headliner having a plurality of transverse headliner attachment strips that are located adjacent each support member and have depending elastomeric retention portions that each have an arrowhead shape which compresses to facilitate insertion into a respective said second channel through its entry slot and expands after insertion to inhibit withdrawal and mount the headliner on the bows, and removable locating means inserted into each channel to laterally locate the attachment strips in their respective channels, wherein the cover attachment strips' retention portions cooperate to secure the fabric cover against removal from the frame during normal top operation, while enabling removal of the fabric cover from the frame upon application of a sufficiently large force to each attachment strip to deform its retention portion to enable its passage back through its respective entry slot, and wherein each channel and its entry slot are open-ended and the locating means are removable, enabling dismounting of a selected bow from the fabric cover by endwise sliding of the selected bow relative to its respective fabric cover, stay pad, and headliner attachment strips.

8. The convertible top of claim 7, wherein one of the support members includes a third open-ended transverse channel with an open-ended entry slot restricting entry to the third channel, and the top includes a panel containing a backlite having a transverse backlite panel attachment strip located adjacent said one of the support members and has a depending elastomeric retention portion which compresses for passage into the third channel through its entry slot and expands in said third channel to mount the backlite panel to said one support member.

* * * * *